Jan. 5, 1954

B. M. WALKER 2,665,400

ELECTRIC CAPACITOR

Filed Nov. 17, 1950

Inventor:
Benjamin M. Walker,
by *Andrew Cohen*.
His Attorney.

Patented Jan. 5, 1954

2,665,400

UNITED STATES PATENT OFFICE 2,665,400

ELECTRIC CAPACITOR

Benjamin M. Walker, Lenox, Mass., assignor to General Electric Company, a corporation of New York Application November 17, 1950, Serial No. 196,180

4 Claims. (Cl. 317—258)

The present invention relates to electrical capacitors. More particularly, it relates to an electrical capacitor having a dielectric impregnant of solidified resinous material which is characterized by an improved life under high temperature conditions.

Capacitors employing solid resinous or plastic material as the dielectric impregnant are known and in general have been preferred for many applications over those containing liquid dielectric media. Polystyrene is an example of a solid, plastic material having dielectric qualities which make it particularly attractive for use in capacitors. However, from a manufacturing point of view, the volatile styrene monomer is unsuitable as an impregnating material for a rolled or stacked capacitor because as it polymerizes it produces a mass which is filled with bubbles, cracks and voids which in the capacitor result in electrical breakdown and short life. Polystyrene, further, is unsuitable as a capacitor impregnant for capacitors operating at elevated temperatures of 110° C. or higher, because of its relatively low softening point of about 80–85° C. These characteristics of polystyrene have heretofore caused it and some of its copolymers to be abandoned from practical consideration as suitable dielectric impregnants in high temperature applications.

It is an object of this invention to provide an improved dielectric impregnant for capacitors containing a copolymer of styrene, alpha methyl styrene and divinyl benzene which is stable at temperatures up to and exceeding 110° C.

It is a further object of this invention to provide an electrical capacitor comprising as a dielectric impregnant said copolymer which possesses and retains favorable dielectric characteristics after long periods of operation at such elevated temperatures.

Figure 1:
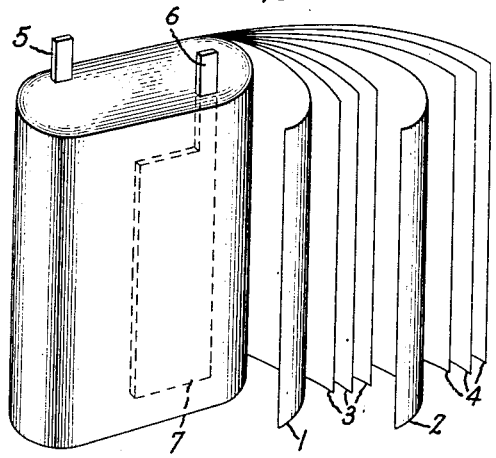
Figure 2:
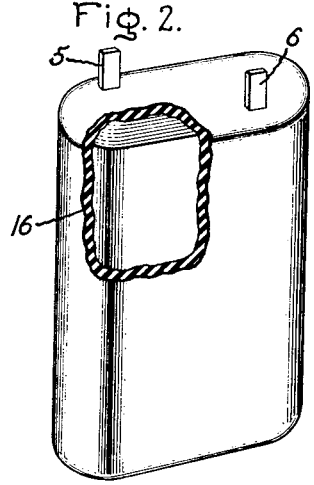
Figure 3:
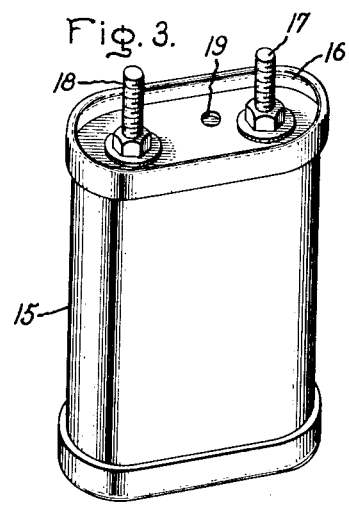
Figure 4:
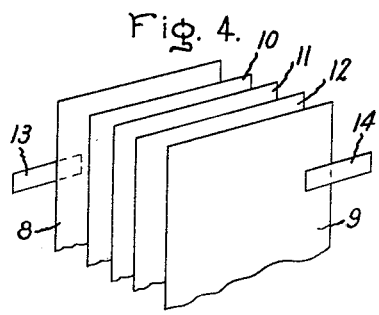

Other objects of the invention will become apparent from a consideration of the following description thereof taken in connection with the accompanying drawing in which Fig. 1 is a perspective view of a partially uncoiled capacitor assembly; Fig. 2 shows a resin polymer-impregnated capacitor assembly partially in section without the container; Fig. 3 is a perspective view of a capacitor complete with container; and Fig. 4 shows an alternative arrangement of the capacitor armature and dielectric elements.

It has been found that electrical capacitors of superior characteristics may be made by using as a dielectric impregnant the product of polymerization of styrene, polyalphamethyl styrene and divinyl benzene.

More particularly, it has been found that capacitors of superior electrical and physical characteristics and long life may be made by impregnating the dielectric therein with a mixture of styrene monomer, liquid poly-alphamethyl-styrene and divinyl benzene, as hereinafter disclosed, and thereafter curing the plastics mixture in situ to a solid resinous state.

The resin composition employed in the practice of this invention is of a type which, upon curing, solidifies without the evolution of water or water vapor as do the so-called condensation curing plastics. Neither does the present copolymer composition evolve deleterious volatile solvents or thinners during the heat curing cycle, the mass curing to the solid state without the formation of any of the bubbles, cracks and voids which attend the resinification of styrene alone. The present composition is furthermore chemically stable at temperatures of at least 110° C. for long periods of time and maintains its electrical efficiency over such extended periods.

In addition to a small amount of a suitable catalyst, the impregnating composition of the present invention is composed as follows, all percentages being by weight:

| | Per cent |
|---|---|
| Styrene monomer | 45–65 |
| Liquid polyalpha-methyl styrene | 25–55 |
| Divinyl benzene in solution | 0.5–10 |

The preferred composition is as follows:

| | Per cent |
|---|---|
| Styrene monomer | 56 |
| Liquid polyalpha-methyl styrene | 41.5 |
| Divinyl benzene in solution | 2.5 |

The divinyl benzene, being unobtainable commercially in pure form at present, is added in solution with the other materials present in the commercial product. However, of the materials present in such solutions, it is the divinyl benzene which imparts the desired characteristics to the present resinous mixture. Solutions containing from eighteen to eighty-seven per cent of divinyl benzene with other compounds have been used, the quantity of solution used being adjusted to provide the desired amount of divinyl benzene in the resinous mixture. Other compounds usually present in the divinyl benzene solution and which are inert in so far as the present invention is concerned are diethyl benzene, ethyl vinyl benzene and the so-called high boilers which include naphthalene and other saturated hydrocarbons. A typical divinyl benzene solution used had the following per cent by weight composition:

| | |
|---|---|
| Divinyl benzene | 38–42 |
| Diethyl benzene | 6–12 |
| Ethyl vinyl benzene | 43–49 |
| High boilers | 4–6 |

The above composition and range of compositions have been found to afford that balance of ingredients which will overcome the deficiencies of polymerized solid styrene alone and yet have desirable electrical characteristics and long life. For example, styrene itself shrinks and develops cracks upon resinifying whereas the above-described mixtures can readily be converted to a solid state with substantially no cracking of the solidified material. The liquid polyalpha-methyl styrene in the prescribed limits shortens the cure time and also renders the polymerization reaction less exothermic and hence less likely to form bubbles or voids than when it is omitted from the composition. In addition, it provides a reactant of low enough viscosity to permit thorough impregnation of the capacitor structure. Its presence also appears to have a plasticizing effect on the final polymer without lowering its softening point. The divinyl benzene in the composition raises the softening point of the poly-alpha-methyl-styrene component but it should not be employed in amounts substantially greater than those set forth due to the fact that in larger amounts it will cause embrittlement of the mass and cracking regardless of the polyalpha-methyl styrene content. The liquid polyalpha-methyl styrene is a low molecular weight polymer of alpha-methyl styrene from the dimer to the octomer. The polymers or mixture of polymers having a viscosity of about 700–1000 centipoises at 60° C. are preferred.

A small amount of catalyst to facilitate the polymerization is usually added to the impregnating mixture, for example, from 0.1 to 2 per cent of tertiary butyl perbenzoate and preferably about 0.6 per cent. Other catalysts which may be used in equivalent quantities are the ozonides, inorganic super oxides such as barium peroxide, sodium peroxides, etc.; aliphatic aryl peroxides such as acetyl peroxide, lauryl peroxide, stearyl peroxide and the like; aromatic acid peroxides such as benzoyl peroxide; other mixed organic peroxides such as acetyl benzoyl peroxide; ketone peroxides such as acetone peroxide, triacetone peroxide; perborates, persulfates and perchlorates among others.

The capacitors of the present invention are constructed in the usual manner except for the dielectric impregnant. Thus, as shown in Fig. 1, the assembly may be made by winding strips 1 of metal foil such as aluminum or copper 1, 2 and interleaved layers 3, 4 of paper to form a coil in which the foil armatures are separated substantially only by the paper layers. Electrical contact may be conveniently made with the armatures by means of tap straps 5, 6 or by folding over the end of the armature foil or other suitable means. The tap straps may be welded to the armature, if desired, to obtain a better contact and the lower part of terminal straps 5, 6 may be enlarged as at 7 to provide a larger contact area.

The dielectric layers or spacers 3, 4 will not usually exceed 0.0005 inch in thickness and, preferably, they are constituted of kraft or linen paper. For operation at voltages up to about 600 volts A.-C. or D.-C., two or three sheets of 0.0003 inch or 0.0004 inch kraft capacitor tissue are very satisfactory. At higher voltages additional layers may be used. An alternative arrangement of the armature and dielectric assembly is shown in Fig. 4 wherein the armatures 8, 9 and 11 and dielectric layers 10 and 12 are in stacked relation, the armatures being connected to terminals 13 and 14 which are conventionally shown.

The process of impregnating the capacitor assembly with the dielectric impregnant and the method of curing the latter is as follows:

The coiled or stacked armature-dielectric capacitor assembly is usually placed in a metal container such as 15 and the cover 16 hermetically sealed thereon, the contact taps or terminals of the assembly being affixed to exterior terminals 17 and 18. In order to allow withdrawal of moisture from the assembly and entry of the impregnant a small hole 19 is provided in container 15 as shown.

Before impregnation the capacitor assemblies are vacuum dried to remove residual moisture. The treating temperature will vary depending on the length of the drying cycle, but usually ranges between 60° C. and 150° C. With too low a temperature the drying period is excessively long while too high a temperature may cause decomposition of the paper dielectric. Capacitors having a volume of about four cubic inches are thoroughly dried, for example, when heated at 125° C. for 16 hours under a broken vacuum cycle of one-half hour at a vacuum of 500 microns of mercury followed by dry air treatment at atmospheric pressure for an additional one-half hour, followed by cooling for four hours under a continuous vacuum.

The liquid plastic material is admitted to the capacitor assembly containers while the dried assemblies are still under a vacuum, enough resin being introduced to completely fill the container. The pressure is then raised to atmospheric condition and the assemblies allowed to stand to permit thorough penetration, the length of time depending upon various factors such as the temperature of the impregnant, its viscosity and the ability of the resin to wet the paper fibers within the capacitor. When the units are allowed to cool to from 40° C. to 50° C. and the resin introduced at that range of temperature, a one-hour soaking or impregnation period is found to be adequate for capacitors having a volume of about four cubic inches.

After impregnation, the units may be either sealed and cured or else cured before sealing. It has been found preferable to seal the units before curing so that the outer surface of the container may be cleaned of all resinous material while it is still in the liquid state.

The curing cycle conditions will depend upon the particular resin composition used and the size of the capacitor. For the cure of the resin compositions disclosed herein in a four cubic inch capacitor, a cure time of four hours at 125° C. is suitable. During the cure the power factor of the units decreases and the capacitance of the units increases, but the four-hour cure as described brings the capacitance to a satisfactory maximum value. The power factor would continue to decrease with further curing, but it is suitably low after four hours. The power factor may also decrease somewhat with subsequent testing and use.

The changes in power factor and capacitance during cure of a capacitor prepared in accordance with the present invention are shown in the following table:

| Hours of Cure | Capacitance, mf. | Power Factor, percent |
|---|---|---|
| 1 | 7.03 | 4.3 |
| 2 | 7.03 | 7.3 |
| 3 | 7.02 | 4.9 |
| 4 | 7.27 | 0.73 |
| 5 | 7.27 | 0.50 |
| 6 | 7.30 | 0.50 |
| 7 | 7.33 | 0.50 |
| 8 | 7.32 | 0.40 |
| 24 | 7.37 | 0.30 |

A program cure may be indicated for capacitors having large open spaces to be impregnated with resin. A typical cure cycle for such a capacitor may, for example, include a rise in temperature from room temperature to about 80° C. in one hour followed by a rise in two hours from 80° C. to 125° C., holding at 125° C. for two hours with cooling to room temperature in one hour.

At temperatures of 85° C. and above electric capacitors embodying the dielectric impregnating material of the present invention possess extraordinary stability which far surpasses that of well known liquid as well as solid dielectrics. Eighteen capacitors using the present dielectric as well as other well known materials were tested at an ambient temperature of 125° C. with an impressed D.-C. voltage of 833 volts per mil thickness of paper dielectric. Of capacitors impregnated with a mixture of 75% pentachlor diphenyl and 25% trichlorbenzene stabilized with one per cent by weight of dichloranthraquinone, 25% failed after 135 hours and 50% failed after 390 hours. Of capacitors impregnated with mineral oil, 25% failed after 135 hours and 50% failed after 710 hours. Of capacitors impregnated with a diallyl phthalate resin, 25% failed after 723 hours and 50% failed at about 830 hours. On the other hand capacitors which were treated with the preferred composition of the present invention had an amazingly long life under the same strenuous conditions. Only after 4320 hours had 25% of the capacitors failed and only after 11,000 hours had as many as 45% failed.

The results of tests carried out at 110° C. with an impressed D.-C. voltage of 833 volts per mil thickness of dielectric were equally as unexpected. Capacitors impregnated with chlorinated diphenyl failed beginning at about 150 hours. When the chlorinated diphenyl impregnant was stabilized failures began at about 300 hours. Capacitors in which the paper dielectric was coated with a straight polystyrene film failed in up to about 200 hours. When the dielectric impregnant used was diallyl phthalate resin, the capacitors had an average life of about 4,000 hours. However, when six capacitors having the present composition as a dielectric impregnant were tested under identical conditions the first failure occurred after 21,250 hours of operation and the other five had not failed after 22,000 hours. This truly amazing life, more than five times as great as that of the next best impregnant, is indicative of the true worth and utility of the present invention. The favorable life characteristics of the present dielectric are also obtained when A.-C. voltage is used.

What I claim as new and desire to secure by Letters Patent of the United States is:

1. An electric capacitor comprising the combination of cooperating metal armatures and interposed paper dielectric spacer, said combination including said spacer being impregnated with a solid resinous product obtained by the in situ copolymerization of a liquid mixture consisting mainly of about 45 to 65 per cent monomeric styrene, 25 to 55 per cent liquid polyalpha-methyl styrene and from 0.5 to 10 per cent divinyl benzene, said liquid mixture having the property of polymerizing to a solid state without the formation of bubbles, cracks and voids in the solidified mass.

2. An electric capacitor designed for operation at temperatures of the order of 110° C. and under impressed D.-C. voltages of about 800 volts per mil of dielectric, comprising the combination of cooperating metal armatures, and an interposed paper dielectric spacer, said combination including said spacer being impregnated with a solid resinous dielectric impregnant consisting substantially of the in situ copolymerization product of a liquid mixture of 45 to 65 per cent monomeric styrene, 25 to 55 per cent polyalpha-methyl styrene having a viscosity of 700–1000 centipoises at 60 deg. C., and .5 to 10 per cent divinyl benzene, said capacitor having a life of at least about 20,000 hours when operated under said conditions of temperature and voltage stress.

3. An electric capacitor designed for operation at temperatures of the order of 110° C. and under impressed D.-C. voltages of about 800 volts per mil of dielectric comprising the combination of cooperating metal armatures and interposed dielectric paper spacer, said combination including said spacer being impregnated with a solid resinous dielectric impregnant obtained by the in situ copolymerization of a mixture of about 56 per cent, by weight, monomeric styrene, 41.5 per cent polyalpha-methyl styrene having a viscosity of from 700–1000 centipoises at 60 deg. C., and 2.5 per cent divinyl benzene, said capacitor having a life of at least about 20,000 hours when operated under the above conditions.

4. A dielectric material consisting essentially of the solid copolymerization product in relative proportions by weight of about 45 to 65 parts monomeric styrene, about 25 to 55 parts polyalpha-methyl styrene having a viscosity of from 700–1000 centipoises at 60 deg. C., about one half to 10 parts divinyl benzene and about 0.1 to 2 parts of a polymerization catalyst, said solid copolymerization product being free of bubbles, cracks and voids.

BENJAMIN M. WALKER.

References Cited in the file of this patent

UNITED STATES PATENTS

| Number | Name | Date |
|---|---|---|
| 1,931,373 | Clark | Oct. 17, 1933 |
| 2,418,978 | Mertens | Apr. 15, 1947 |
| 2,476,737 | Kern | July 19, 1949 |
| 2,539,377 | Staudinger | Jan. 23, 1951 |

FOREIGN PATENTS

| Number | Country | Date |
|---|---|---|
| 410,807 | Great Britain | May 22, 1934 |
| 506,290 | Great Britain | May 25, 1939 |
| 514,156 | Great Britain | Nov. 1, 1939 |

OTHER REFERENCES

"Electronic Applications with a New Casting Resin" by Franklin et al., Plastics, July 1947, pages 57–59.